United States Patent Office 3,654,058
Patented Apr. 4, 1972

3,654,058
METHODS OF CURING ORGANOPOLYSILOXANES AND LAMINATES FORMED THEREBY
Amy L. Jasinski, Reston, Va., and Ian M. Thomas, Temperance, Mich., assignors to Owens-Illinois, Inc.
No Drawing. Continuation-in-part of application Ser. No. 777,139, Nov. 19, 1968. This application Aug. 20, 1970, Ser. No. 65,670
Int. Cl. C08g 31/24, 47/10
U.S. Cl. 161—93      16 Claims

ABSTRACT OF THE DISCLOSURE

A glass cloth laminate prepared from solutions of organopolysiloxanes prepared from trialkoxysilanes. The curing of the organopolysiloxanes is accomplished by the use of a phosphonic acid (or precursor thereof) catalyst which markedly reduces the gel time of the resin in the laminate in the press whereby strong, hard, blister-free laminates are prepared.

CROSS-REFERENCES TO RELATED APPLICATIONS

This is a continuation-in-part application of copending application, Ser. No. 777,139, filed Nov. 19, 1968, now abandoned.

THE INVENTION

The present invention relates to methods of preparing organopolysiloxanes from trialkoxysilanes and markedly reducing the cure time thereof by the use of phosphonic acid (or precursors thereof) catalysts.

It is an object of the present invention to provide a method of curing an organopolysiloxane formed from certain trialkoxysilanes to greatly reduce the curing time thereof.

It is an object of the present invention to provide a method of curing an organopolysiloxane with a phosphonic acid catalyst, the organopolysiloxane and laminates formed thereof with glass cloth forming hard, blister-free articles with greatly reduced gel times in the press.

It is an object of the present invention to provide composite articles, and particularly laminated products, comprising laminae bonded together with an organopolysiloxane prepared and cured according to the present invention. The laminae advantageously are those constituted of inorganic sheet material including, for example, glass in sheet or other form such as glass fiber cloths or mats.

It is an object of the present invention to provide methods of making the aforementioned laminated products to thereby greatly reduce the gel time of the resin in the laminated product in the press to provide strong, hard, blister-free laminates.

These and other objects will be apparent from the specification that follows and from the appended claims.

According to one aspect of this invention, there is provided a method of curing a precured, further curable, organopolysiloxane to provide a thermoset organopolysiloxane wherein the method comprises heating a further curable, solvent soluble, precured organopolysiloxane, in the presence of an effective catalytic curing amount of a phosphonic acid catalyst for a time sufficient to form a hard thermoset organopolysiloxane, said precured, further curable, solvent soluble organopolysiloxane being prepared by:

(A) Heating a mixture of:

(1) a silane which is phenyltrialkoxysilane, or mixtures thereof with methyltriethoxysilane, in which the alkoxy group contains 1 to 6 carbon atoms;

(2) an effective catalytic amount of a hydrolysis catalyst, such as, for example, HCl;

(3) at least about 1.5 moles of water per mole of silane at a temperature between about room temperature and reflux for a time sufficient to form a substantially gel-free solution of a hydrolyzed and partially condensed organopolysiloxane.

(B) Concentrating the solution of step (A) by heating same for a time sufficient to remove some but not all akanol by-product and water, generally for a time sufficient to remove about 50 to about 90 mole percent alkanol by-product, thereby forming a concentrated organopolysiloxane partial condensation product, and (C) Precuring the concentrated partial condensation product of step (B) by heating same below the gel point thereof for a period of time of about 10 seconds to about 60 minutes to form a gel-free, solvent soluble, precured, further curable organopolysiloxane.

The present invention provides a method of curing an organopolysiloxane to provide a thermoset organopolysiloxane, the method comprising the steps of:

(a) Heating a mixture of:

(1) a silane which is phenyltrialkoxysilane or mixtures thereof with methyltrialkoxysilane in which the alkoxy group contains 1 to 6 carbon atoms;

(2) an effective catalytic amount of a hydrolysis catalyst; and (3) at least about 1.5 moles of water for every mole of silane at a temperature of about room temperature to reflux to form an organopolysiloxane partial condensation product prepolymer having a viscosity equivalent to that of about 30 to 310 centipoises at 60% solids at 25° C. in ethanol; and (b) Thereafter curing the product of step (a) at about 90° to 300° C. with a phosphonic acid catalyst which is preferably PhPO(OH)$_2$ for at least about 1 minute to provide a hard, thermoset, blister-free organopolysiloxane.

Excellent glass cloth laminates can be prepared from the above described organopolysiloxane and excelent laminates can be prepared with the use of a phosphonic acid catalyst to greatly reduce the gel time in the press and provide blister-free laminates.

Suitable trifunctional silane starting materials to provide the precured, further curable polymers and then the cured or thermoset polymers by the use of a phosphonic acid catalyst are phenyltrialkoxysilanes or mixtures of phenyltrialkoxysilanes and methyltrialkoxysilanes in which at least about 60% by weight of the mixture is phenyltrialkoxysilane and in which the alkoxy group has 1 to 6 carbon atoms and preferably 2 to 3 carbon atoms.

Highly preferred trifunctional materials are phenyltriethoxysilanes and methyltriethoxysilane. It is preferred that the molar ratio of phenyltriethoxysilane to methyltriethoxysilane be about 4:1 although generally good results can be obtained using a ratio of about 2.5:1 or 3:1 up to about 5:1.

Suitable phosphonic acid curing catalysts are $$PhPO(OH)_2$$

where "Ph" means "phenyl" or precursors of these materials such as PhPOCl$_2$ which yield phenylphosphonic acid during the reaction. Of the phosphonic acid starting catalysts, phenylphosphonic acid is preferred. Other suitable phosphonic acids are aromatic phosphonic acids such as aryl including naphthyl, anthracenyl, etc. and alkylaryl including tolyl, xylyl, etc. Precursors of phosphonic acid can be used which form phosphonic acid in situ such as phosphonic dichlorides and phosphonic dibromides.

It is preferred that the phosphonic acid catalyst be used in an amount of about 2 to 4% by weight of the organopolysiloxane in a solvent such as xylene but suitable results can be obtained with as low as about ½ to 1% by weight of the phosphonic acid catalyst or as high as about 6 to 8% by weight thereof.

In general, prepolymers to be condensed and thereafter solidified by spray drying or dried in a wiped film evaporator or otherwise converted to solvent soluble liquids or solids that are free from gel and, in the case of solids that are tack-free at room temperature, are prepared by (1) Heating a mixture of (a) a silane that is phenyltrialkoxysilane or a mixture thereof with methyltrialkoxysilane; and (b) an effective amount of a hydrolysis catalyst such as HCl in an amount of about 1 to 600 p.p.m. based on the weight of silane and water, at a temperature of preferably about 65 to 85° C. for a period of time of from about 1 to 10 hours; and (2) Concentrating the liquid siloxane partial condensation product from step (1) to remove some but not all volatile material including alkanol by-product and some water and to obtain a liquid residue having a viscosity equivalent to that of generally about 30–310 centipoises at 60% solids at 25° C. in ethanol.

Thereafter, the prepolymer product of step (2) is precured at temperatures from slightly below, say 5° C., to as much as about 50° C. below the gel point of the resin for a period of time of about 10 seconds to 60 minutes, the 60 minutes requiring the lower temperatures. The precuring can also be accomplished in an economical and reproducible manner in a wiped film evaporator by forming a liquid film of a prepolymer product of step (2) and heating the same at about 90 to 180° C. As used herein, the gel point of the resin is that temperature at which a 50 gram sample of prepolymer gels when placed in a 100 ml. beaker and stirred on a 600° F. (approximately 315° C.) hot plate.

An unexpected advantage of phenylphosphonic acid catalyst is that it appears to be ineffective below 135° C. and slow to act below 180° C.; it can, therefore, be added to the resin solution prior to the precuring or solvent distillation step in the wiped film evaporator if required. Solutions of the precured resin containing catalyst are also stable for long periods at room temperature.

The mixture of phenyl and methyl precured polymers is preferably made by:

(1) Heating a mixture of (A) about 1 mole of methyltriethoxysilane with about 3½ to 4½ moles of phenyltriethoxysilane;

(B) about 1.5 to about 3 or 4 moles of water for every mole of total silane present, there being at least a trace of hydrolysis catalyst present in the reaction mixture and preferably 1 to 10 parts HCl per million parts of water and silane, at a temperature of about 80° C. for a period of time of from about 2 to about 6 hours; and thereafter, the mixture is further processed by (2) Concentrating the liquid siloxane partial condensation product from step (1) by distilling at the reaction temperature until approximately 60–70% of the theoretical yield of ethanol is removed, thereby to remove some but not all volatile material including alkanol by-product and some water and to obtain a liquid residue that in the case of a methylsilane: phenylsilane ratio of about 2.5:1 to 1.5:1 has a viscosity of about 30 to 60 or 65 centipoises at 60% solids and 25° C. in ethanol or in the case of a methyl:phenyl ratio of about 1:3.5 to 1:4.5 has a viscosity of about 150 to 310 centipoises; and (3) Precuring or further condensing the prepolymer product of step (2) preferably by forming a thin film thereof by heating the film to a temperature of about 140° to 190° C. which is a temperature of from about slightly below the gel point to about 30° C. below the gel point of the resin and holding this temperature for a period of time of from about 5 to 10 up to about 120 seconds.

Unless otherwise noted, viscosity in centipoises used herein is that measured with an RVF Brookfield Viscometer in accordance with ASTM 2196–63T "Rheological Properties of Non-Newtonian Liquid."

As indicated previously, a particularly valuable embodiment of the present invention is the production of products or articles comprising laminae having binders comprising or consisting essentially of the organophosphonic acid catalyst cured organopolysiloxanes of the present invention. As also previously indicated, the preferred laminate product is one made of fibrous glass cloth or mats which are impregnated with the oragnopolysiloxane prepolymer and thereafter the prepolymer is cured in a press by the use of pressure with a great reduction of the gel time. Yet, the resultant articles are strong and blister-free.

In general, articles other than the fiber glass/phosphonic acid catalyst-organopolysiloxane composite of the present invention can result when the laminae are glass such as sheet or flat glass.

Outstanding laminates can be made using the above described organopolysiloxane and mica or asbestos or graphite, with mica composites being especially outstanding.

Illustrative examples of other materials that may be laminated or bonded together with the phosphonic acid catalyst-cured organopolysiloxane of the present invention are metals, e.g., aluminum and its alloys, copper and its alloys, ferrous metals such as iron and its alloys including ordinary steel, stainless steel, tin and chromium-coated steels, magnesium and its alloys, and the like, in sheet, cast or other form. If desired for some applications, two or more of the laminae may be constituted of the same or different materials such as, for example, fabrics or sheets of fibrous materials including the preferred glass fiber materials as well as cotton, linen, wool, silk, and other natural fibrous materials; of synthetic or artificial filamentary materials (both organic and inorganic) such as viscose and cuprammonium rayons, cellulose esters such as cellulose acetate and cellulose butyrate, nylon, polyester, acrylic resin, and polyimides; and such materials as paper, paperboard, solid high-melting (or unmeltable) natural and synthetic, thermoplastic and thermosetting resins, as well as the aforementioned preferred fibrous glass woven cloth or mats.

As will be understood by those skilled in the art, the time and temperature of the curing of the phosphonic acid cured organopolysiloxane and the particular materials or bodies to be laminated are correlated so that the in situ curing temperature and time will not adversely affect the useful properties of the laminae.

The following examples are intended to illustrate the present invention and not to limit the same:

Example 1

In this example, an all phenyl organopolysiloxane polymer was prepared from phenyltriethoxysilane. The above described silane monomer was hydrolyzed with water and hydrochloric acid as the hydrolysis catalyst and thereafter condensed according to the formulation as set forth below:

INGREDIENTS

| | | |
|---|---|---|
| Phenyltriethoxysilane | 240 grams | 1 mole. |
| Water | 72 grams | 4 moles. |
| 0.1 N HCl solution | 1 ml | About 10 p.p.m. |

The reagents were heated slowly with stirring and the initially two phase system changed to a clear, homogeneous solution at 70° C. The solution was refluxed for 4 hours and ethanol and water then distilled off until the temperature reached 95° C. The liquid polymer was transferred to an open beaker and further condensed by heating to 160° C. on a hot plate. On cooling, a clear, hard, brittle, solid prepolymer was obtained; this had a molecular weight of approximately 1600 and contained approximately 3–4% residual ethoxy groups and 10–14% residual silicon-hydroxyl groups.

Example 2

The prepolymer described in Example 1 was dissolved in xylene to give 50% solution by weight. Two percent phenylphosphonic acid by weight based on resin weight was then added to the solution and the latter stirred until the acid had dissolved. Style 181, heat cleaned, neutral pH type E glass cloth was then dipped in this solution and air dried for 2 hours. The cloth was cut into squares 7" x 7" and these were stacked to give 14 plies; the stack was placed in a press at 400° F. and slight pressure applied until the resin gelled (10 minutes). The pressure was then increased to 500 p.s.i. (20,000 lb. total) and after 30 minutes the press was cooled to 200° F. and the laminate removed. A post-cure involving heating slowly to 400° C. over a period of 12 hours and holding at 400° C. for 4 hours was given.

A strong, hard laminate was obtained containing about 25% resin by weight; the flexural strength was about 28,000 p.s.i. at room temperature with a modulus of about $3.5 \times 10^6$ p.s.i. and about 18,000 p.s.i. at 700° F. with a modulus of about $2.6 \times 10^6$ p.s.i. These figures were substantially unchanged after the laminate had been heated in air at 700° F. for 500 hours.

Example 3

Laminates were prepared as in Example 2 except that 4% phosphonic acid by weight based on resin weight was added to the resin solution prior to dipping the glass cloth. In this case, the gel time in the press was reduced to 3 minutes at 400° F. Laminate strength and thermal stability were substantially the same as those in Example 2.

Example 4

Laminates were prepared as in Example 2 except that no phenylphosphonic acid catalyst was used in the resin solution. In this case, the gel time in the press was increased to 50 minutes at 400° F. and severe blistering occurred in the laminates during the post-cure due to softening of the resin during this cure. It was not possible to obtain representative strength measurements on these laminates because of this blistering.

Example 5

Other laminates were prepared with and without phenylphosphonic acid catalyst at different press temperatures and the gel times are summarized in the table below:

| | Catalyzed resin | Uncatalyzed resin |
|---|---|---|
| Press temperature: | | |
| 350° F | 20 minutes (2% catalyst) / 10 minutes (4% catalyst) | 90 minutes. |
| 450° F | | 25 minutes. |
| 500° F | | 10 minutes. |

In all laminates prepared from uncatalyzed resin, blistering occurred during the post-cure, whereas those prepared from catalyzed resin contained no blisters and had strength and stability substantially the same as the laminate described in Example 2.

Although not wishing to be bound by theory, it may be that the major effect of the phosphonic acid addition to the resin is catalytic for self-condensation of silanol groups in the resin and/or reaction of the silanol groups with the residual silicon-ethoxy groups in the resin.

Example 6

An organopolysiloxane was prepared from the following formulation:

INGREDIENTS

| henyltriethoxysilane | 240 grams | 1.0 mole. |
|---|---|---|
| Methyltriethoxysilane | 44.5 grams | 0.25 mole. |
| Water | 90 grams | 5.0 moles. |
| 0.1 N HCl solution | 0.5 ml | About 5 p.p.m. |

The reagents were heated with stirring as in Example 1 and a clear, homogeneous solution was obtained at 60° C. After refluxing for 4 hours, ethanol and water were distilled off until the temperature reached 90° C. The liquid prepolymer was then transferred to an open beaker and further condensed by heating to 160° C. on a hot plate. On cooling, a clear, hard, brittle, solid prepolymer was obtained; this had a residual ethoxyl content of approximately 4–5% and a silicon-hydroxyl content of approximately 10%.

Example 7

The prepolymer described in Example 6 was dissolved in xylene to give a 50% solution by weight. Laminates were then prepared from uncatalyzed solution and solutions containing 1% and 3% phenylphosphonic acid or phenylphosphonic dichloride catalyst by the procedure described in Example 2. The gel times in the press of catalyzed and uncatalyzed laminates is shown in the table below:

| | Catalyzed resin | Uncatalyzed resin |
|---|---|---|
| Press temperature: | | |
| 350° F | 20–30 minutes (1%) / 5–7 minutes (3%) | 90 minutes. |
| 400° F | 10–15 minutes (1%) / 1–2 minutes (3%) | 40 minutes. |

A post-cure involving slow heating to 300° C. over a period of 12 hours and holding at 300° C. for 4 hours was given to all laminates. In this case, no blistering of the uncatalyzed laminates occurred and they appeared to be substantially the same as catalyzed laminates. Resin content in most cases was about 25% by weight and the flexural strength at room temperature was about 40,000 p.s.i. with a modulus of about $3.2 \times 10^6$ p.s.i. and at 300° C. was 24,000 p.s.i. with a modulus of about $2.9 \times 10^6$ p.s.i.

Example 8

Solutions of the resin described in Example 6 in xylene were used to prepare coatings on metal panels. When aluminum panels were dip coated in the resin solution containing 3% phenylphosphonic acid catalyst, a clear, hard, solvent-resistant coating was obtained after a cure at 220° C. for 60 minutes. Uncatalyzed resin coatings did not cure to a solvent resistant coating after 2½ hours at 220° C.

On chrome and brass panels the cure time for catalyzed coatings at 220° C. was 40 minutes whereas uncatalyzed coatings did not cure after 2½ hours at 220° C.

In the above examples, other previously described silane starting materials can be used and other previously described phosphonic acid catalysts can be used in place of the actual starting materials.

In the above examples, other hydrolysis catalysts can be used to provide substantially equivalent results. Such hydrolysis catalysts include inorganic acids such as HBr, $H_2SO_4$, $HNO_3$, $H_3PO_3$ and $H_3BO_3$. Also effective as hydrolysis catalysts are organic acids including formic, acetic, propionic and citric. Also, certain neutral hydrolysis catalysts can be used when the hydrolysis conditions are neutral at about pH 7, such catalysts including vanadium oxide, vanadium chelates, aluminum chelates, zirconium chelates and iron chelates.

It is understood that various modifications of the present invention may be made without departing from the spirit and scope thereof.

What is claimed is:

1. A method of preparing a solid, cured organopolysiloxane comprising the steps of
   (A) heating a mixture of
      (1) a silane which is selected from the group consisting of phenyltrialkoxysilane and mixtures of phenyltrialkoxysilane and methyltrialkoxysilane in which the phenyltrialkoxysilane is present in an amount of at least 50% by weight of the mixture, and in which the alkoxy group contains 1 to 6 carbon atoms;
(2) an effective amount of a hydrolysis catalyst; and
(3) at least about 1.5 moles of water for every mole of silane at a temperature of about 25° to 160° C. for about 1 to 20 hours to form an organopolysiloxane partial condensation product prepolymer having a viscosity equivalent to that of about 30–310 centipoises at 60% solids at 25° C. in ethanol;
(B) curing the product of step (A) at about 90–300° C. for at least about 1 minute with a phosphonic acid curing catalyst to provide a thermoset organopolysiloxane.

2. A method as defined in claim 1 in which the phosphonic acid curing catalyst is phenylphosphonic acid.

3. A process as defined in claim 1 in which the phosphonic acid precursor catalyst is phenylphosphonic chloride.

4. A method as defined in claim 1 in which the silane is phenyltrialkoxysilane.

5. A method as defined in claim 2 in which the silane is phenyltrialkoxysilane.

6. A method as defined in claim 1 in which the silane is a mixture of about 4 moles of phenyltrialkoxysilane and 1 mole of methyltrialkoxysilane.

7. A method as defined in claim 2 in which the silane is a mixture of about 4 moles of phenyltriethoxysilane and 1 mole of methyltriethoxysilane.

8. A method as defined in claim 1 in which a laminate is prepared from the product of step A and a fiber glass mat, and the resultant laminate is cured as defined in step B in a press with pressure whereby the gel time of the prepolymer is reduced in said press.

9. A laminated product in which individual layers of superimposed sheet material are adhesively bonded together with the thermoset organopolysiloxane product resulting from the method of claim 1, said organopolysiloxane being finally cured in situ.

10. A product as defined in claim 9 in which the sheet material is fiber glass cloth.

11. A laminated product as defined in claim 9 in which at least one of the layers of the sheet material is inorganic sheet material.

12. A laminated product as defined in claim 11 in which at least one of the layers of the inorganic sheet material is glass.

13. A composite about 50 to 95 parts by weight of a filler and about 5 to 50 parts by weight of the thermoset organopolysiloxane product resulting from the method of claim 1, said organopolysiloxane being finally cured in situ.

14. A product as defined in claim 13 in which the filler is mica.

15. A product as defined in claim 13 in which the filler is asbestos.

16. A method for providing a hard, thermoset organopolysiloxane which comprises curing a further curable, precured organopolysiloxane in the presence of an effective catalytic curing amount of a phosphonic acid catalyst, said further curable, precured organopolysiloxane being prepared by the steps of:
(A) heating a mixture of:
(1) a silane selected from the group consisting of phenyltrialkoxysilane and mixtures of phenyltrialkoxysilane and methyltrialkoxysilane wherein said alkoxy group contains 1 to 6 carbon atoms;
(2) at least about 1.5 moles of water for every mole of silane; and
(3) an effective catalytic amount of a hydrolysis catalyst at a temperature between ambient and reflux to form a solution of a hydrolyzed and partially condensed organopolysiloxane;
(B) concentrating the solution of step (A) by heating to remove some but not all alkanol by-product and water; and
(C) precuring the product of step (B) by heating below the gel point thereof to form said further curable, precured organopolysiloxane.

References Cited

UNITED STATES PATENTS

| | | | |
|---|---|---|---|
| 3,549,590 | 12/1970 | Holdstock et al. | 161—193 |
| 3,479,316 | 11/1969 | Levene | 161—193 |
| 3,457,224 | 7/1969 | Thomas | 161—193 |
| 3,332,817 | 7/1967 | Obenhaos | 161—163 |
| 3,069,302 | 12/1962 | Lewis et al. | 161—163 |

ROBERT F. BURNETT, Primary Examiner

M. A. LITMAN, Assistant Examiner

U.S. Cl. X.R.

156—329; 161—163, 193; 260—46.5